Figure 3:
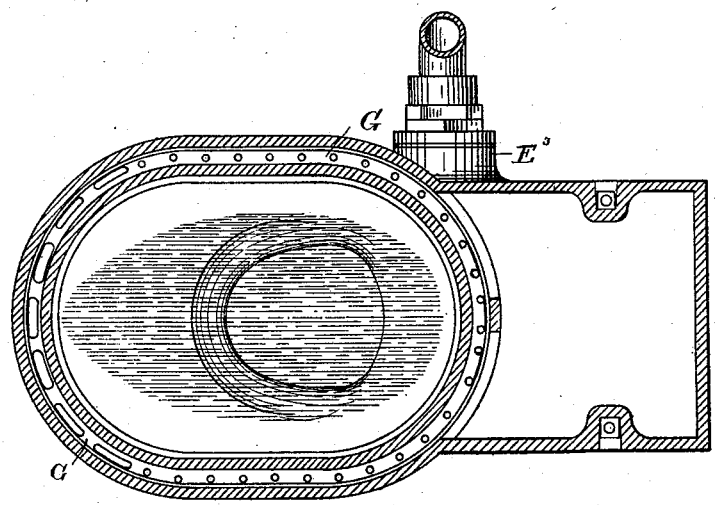

(No Model.) 2 Sheets—Sheet 1.
J. P. PUTNAM.
WATER CLOSET.
No. 588,292. Patented Aug. 17, 1897.
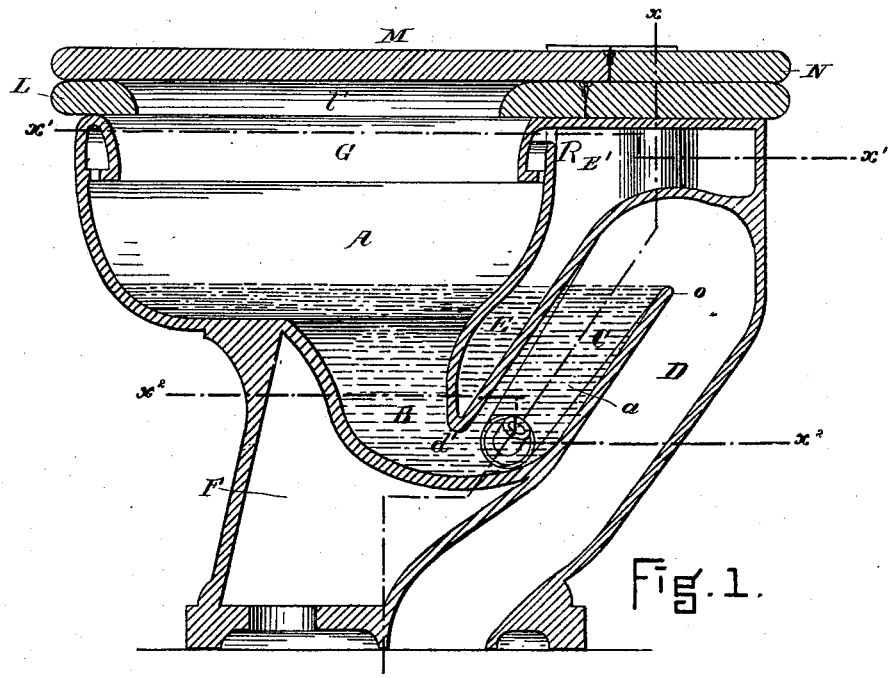
Fig. 1.
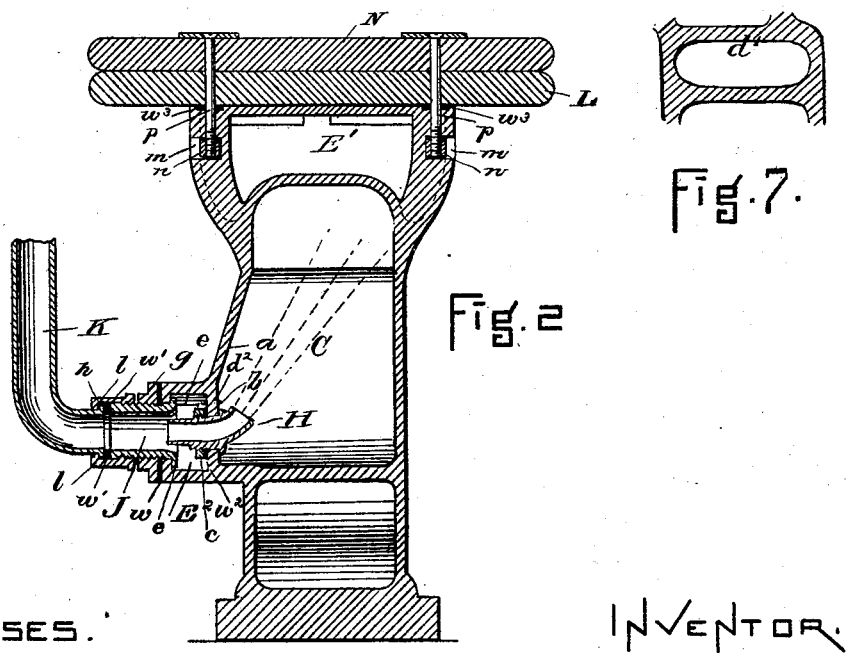
Fig. 2.
Fig. 7.
Witnesses.
Inventor.

(No Model.) 2 Sheets—Sheet 2.

J. P. PUTNAM.
WATER CLOSET.

No. 588,292. Patented Aug. 17, 1897.

Witnesses.
Waldron Bates
Stephen F. Moroney

Inventor.
J. Pickering Putnam
by W. W. Swan
his atty

UNITED STATES PATENT OFFICE.

JOHN PICKERING PUTNAM, OF BOSTON, MASSACHUSETTS.

WATER-CLOSET.

SPECIFICATION forming part of Letters Patent No. 588,292, dated August 17, 1897.

Application filed July 19, 1887. Serial No. 244,758. (No model.)

*To all whom it may concern:*

Be it known that I, JOHN PICKERING PUTNAM, of Boston, Massachusetts, have invented a new and useful Improvement in Water-Closets, of which the following is a specification.

The invention relates to trapped water-closets that employ both an upper and lower flushing-stream, one entering the trap and the other entering the basin. An example of such a water-closet is shown in my Patent No. 285,924, and the present invention is an improvement thereon. In the operation of the water-closet of the said former patent and water-closets of the same general description, first, the lower flushing-stream acts directly upon the contents of the lower portion of the trap to overcome the inertia of the contents of the entire upcast limb of the trap, including heavy matters that have fallen from the basin into the trap, and, this action having substantially lowered the level of the water in the basin, second, the upper flushing-stream flows over the upper edge of the basin to wash the walls of the basin and, by joining the current of the lower flushing-stream, to carry into that stream any light matters that have not sunk to the bottom of the trap.

The water-closet embodying the present invention retains the same general characteristics and mode of operation, but with important improvements, and of these more particularly, first, an improvement relating to the entrance of the lower flushing-stream in such closets, and, second, an improvement relating to the shape or form of the basin and its neck in such closets.

The first improvement has for its object the lessening of noise in the operation of the closet. In the former closets the lower stream or a substantial portion of it entering at the bottom of the trap or at a considerable distance below the level of the dip at times drives out the contents of the trap with such force and rapidity as to bring the level of the water below that of the dip and thus permit air to enter the upcast limb of the trap along with the water. This causes a roaring noise. Moreover, the noise of the flushing-water striking the walls of the trap can be plainly heard. In carrying out my present invention I remedy these objections by introducing the entire lower flushing-stream into the upcast limb of the trap in close proximity to the level of the dip. Again, a flushing-stream entering the upcast limb of the trap at this point will meet with less resistance than it meets when it enters the bottom of the trap, and therefore one of less power will be able to drive out enough of the contents of the trap to destroy the equilibrium between the trap and basin and draw matters within the basin into the neck.

The second improvement has for its object the economy of water in both the lower and upper flushings, provision being made for the more perfect working of the two flushings in combination, and this object is accomplished by constructing the closet with, first, a bowl or basin proper having a substantially flat bottom; second, a deep neck opening from the flat bottom of the basin proper abruptly, or at such an angle that the water of the upper flushing flowing over the flat bottom will bound over and fall into the middle of the neck rather than flow down the sides of the neck, and, third, an S-trap the level of the overflow of which is a little higher than the flat bottom of the basin.

I am aware that water-closets have been provided with bowls or basins that are shallow in the front of the basin proper, or that portion of the closet where urine is received, and deep to the rear, or in the portion where heavier matters fall, and I make no claim therefor; but while the closet shown in the drawings has incidentally the feature here disclaimed it differs from any former water-closet that has been brought to my attention in having both a flat bottom and a well-defined deep neck.

In the operation of my closet a considerable portion of the water flowing over the flat bottom has a free fall of appreciable depth before passing under the dip of the trap, and thus strikes squarely and forcibly on the top matters that have been drawn down into the neck by the first flushing and are there floating to carry them farther down and out, whereas in the old closets which have bowls that are shallow in front and deep behind and are provided with S-traps the dip is substantially at the level of the flat bottom, so that there is a tendency for paper and such matters after the first suction or lowering of the water in the basin to remain substantially at the level of the flat bottom, especially if the dip is not uncovered and water cannot fall upon them from above, or if in the old closets containing bowls shallow in front and deep behind and S-traps the dip is well down in the deep portion of the closet there is no well-marked point where the shallow and deep portions may be distinguished one from the other, but, on the contrary, they run into each other on a continued curve, so that flowing water tends to hug the walls of the closet throughout its passage from top to bottom and, getting under matters in the lower portion, buoys them up.

Other improvements forming part of my present invention consist in details of construction that are hereinafter particularly specified.

Figure 5:
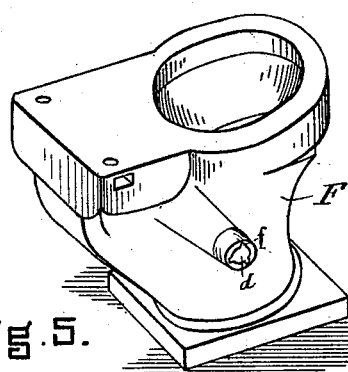
Figure 6:
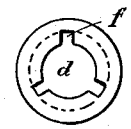
Figure 4:
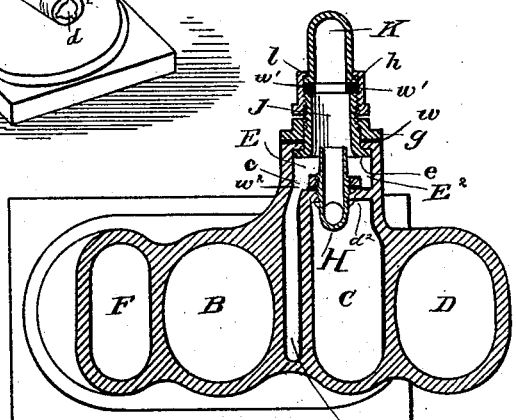

In the drawings, Figure 1 is a vertical sectional elevation of a water-closet embodying my present improvements. Fig. 2 is a section on line $x\ x$ of Fig. 1. Fig. 3 is a section on line $x'\ x'$ of Fig. 1. Fig. 4 is a section on line $x^2\ x^2$ of Fig. 1. Fig. 5 is a perspective view of the closet with the cover removed. Figs. 6 and 7 represent details of construction.

A is the basin proper. B is the neck of the basin. C is the upcast limb of the trap. D is the downcast limb of the trap. E is a chamber between the basin and neck on one side and the upcast limb of the trap on the other, while the upper portion opens into a second chamber E′, that lies above the upper bend or knee of the trap. All these parts in the closet in which I have embodied my invention are formed in the clay, as is also the lower portion or support F of the closet, which is itself a shell, there being within it an unused space or chamber, as shown. The chamber E is utilized as a passage-way and the chamber E′ as a passage-way and a reservoir for water, as will hereinafter appear. By placing the upcast limb at the rear of the closet and utilizing the space above the trap behind the basin and the space between the basin and the upcast limb of the trap a compactness of construction is obtained of great advantage when, as is usually the case, the closet is placed against the wall of a room. A portion of the walls of the chamber E′ serve as a support for the trap when the closet is undergoing the process of baking, as the closet is then reversed. Moreover, these walls are utilized for a support for the fixed portion or back piece of the seat, as hereinafter described.

G is the flushing-rim, also formed in the clay, the space within it opening out of the chamber E′, as shown. A projection or dam R increases the capacity of the chamber E′ as a retarding-chamber for the upper flushing and as a reservoir from which to restore the seal. The chamber E has a recess E², formed in the clay, mostly upon the outside of the upcast leg C of the trap. Its projecting wall is marked E³.

H is a short bent threaded pipe inserted in a hole $d^2$ in the clay wall between the recess E² of the chamber E and the upcast limb C of the trap. I have shown the nozzle of the pipe H placed just above the level of the dip, but it will answer to place it at any point in close proximity to the level of the dip where it will not uncover the dip in its operation, as herein described. The pipe H has a flange $b$, which abuts against the inner wall of the trap, as shown, and it is held in place by a check-nut $c$, placed upon the pipe through a hole $d$ in the outer wall of the recess E² of the chamber.

The supply connection is made as follows: J is a short threaded pipe having three projecting lugs $e$ at one end corresponding to three slots $f$ in the outer wall of the recess E² about the hole $d$. One end of this pipe having been passed through the said hole $d$, the said lugs passing through the said slots, is then held by a flanged nut $g$, screwed up against the outer wall of the recess E², a suitable washer $w$ intervening, as shown. K is the supply-pipe. It has a flange $h$ and is held in place by a tailpiece $l$, screwed upon pipe J and drawing against said flange, a suitable washer $w'$ intervening.

It will be observed that the pipe H enters the pipe J a short distance, leaving an annular space between the two pipes for a communication between pipe J and the chamber E. A washer $w^2$ is provided for check-nut $c$, as shown. Within the upcast limb of the trap the pipe H has a slight bend that it may discharge its water in the general direction of the overflow or outlet. Moreover, the upcast limb of the trap is formed with a bulge, as shown at $a$, at the side at which the pipe H enters, which bulge gradually contracts from bottom to top, as shown, this formation permitting the pipe H to be placed at one side out of the direct passage-way through the trap, so that it is no obstacle to the passage of solid matters through the closet, while by the gradual contraction the flushing-water entering through the pipe H is to some extent directed across the upcast limb of the trap as it flows in its general upward direction toward the overflow.

It will be observed, moreover, that the passage through the closet is essentially contracted in the perpendicular direction in the bend around the dip at the junction between the neck B and limb C of the trap, so as to bring within the more certain sweep of the upper flushing-water all matters lying at the bottom of the neck. (See Fig. 7, representing a vertical section of said passage-way at the dip.)

L is the seat for the closet and contains the ordinary opening or hole $l'$.

M is the cover, hinged to a back piece N, which with the back piece for the seat, also hinged to the closet, is secured as follows: Two holes $m\ m$ are left in the wall of the chamber E in baking and two perpendicular holes are bored through the wall to enter said holes $m\ m$. Two nuts $n\ n$ are pushed into the holes $m\ m$, and into these nuts $n\ n$ are screwed two bolts $p\ p$, which pass through the back piece N, seat L, and holes $m\ m$, as shown. Two washers $w^3\ w^3$ relieve the strain upon the pottery.

The closet is flushed as follows: A fresh supply of water entering through the supply-pipe divides as it leaves the pipe J, one portion passing through the pipe H immediately into the upcast limb of the trap on the farther side of the dip $d'$ and just above the level of said dip. This body of water acting with great force upon the water already in the trap between the level of the dip $d'$ and the level of the overflow $o$ drives that water out and thus destroys the equilibrium between the water in the trap and the water in the basin and neck of the closet and thereby causes the contents of the basin and neck to sink toward the bottom of the basin; but since all the water of this lower flushing enters the trap in close proximity to the level of the dip, or so high as to at no time bring the level of the water down below the level of the dip, there is never any air-space between the dip and the water and air cannot rush through to make a noise. Moreover, there always being a body of water covering the dip, such water will at all times serve as a muffler for any noise made in the upcast limb of the trap by the flushing-water striking against the wall of that limb. The other portion of the fresh supply-water leaving the pipe H through the annular space between that pipe and the pipe J has in the meantime slowly filled the chambers E and E', and now, overflowing into the flushing-rim, descends therefrom down the walls of the basin into the neck, where it strikes the paper and other light matters that have been drawn into the neck by the destruction of the equilibrium between the water in the upcast limb of the trap and that in the basin and neck, as aforesaid, and then the two streams, acting together, carry out all the matters remaining in the closet. When the fresh supply is cut off, the water remaining in chamber E' restores or helps to restore the seal, a part of it flowing down through the flushing-rim and a part falling back and flowing through pipe H.

The bottom of the basin proper is, as shown, large in area compared with the area of a horizontal section of the neck, and it is so flat that a very shallow body of water, although of large superficial area, will cover it. The quantity of water in the basin is consequently small, and, although of the desirable large superficial area, is readily drawn into the neck at the beginning of the flushing, and it will be observed that the water is shallow in the front of the basin proper, or that portion of the closet where urine is received, and deep to the rear, or in the portion where heavier matters fall, and that when the closet is in use or ready for use before flushing every portion against which foreign matter might at any time strike is covered by water. The flat shape of the bottom of the basin proper causes the water of the upper flushing that flows over the bottom to bound over and fall upon matters in the middle of the neck rather than flow down the sides of the neck and buoy those matters up.

The closet described above as one in which I have embodied the foregoing improvements is constructed of clay, except the seat and cover, but it is obvious that portions of it might, if desired, be constructed of other material without departing from features of the invention made the subject of claim.

I claim—

1. A water-closet provided with an S-trap and two flushing-inlets, one entering the basin of the closet at the upper edge, and the other entering the upcast limb of the trap in close proximity to the level of the dip and opening toward the outlet or overflow, substantially as described.

2. In a water-closet having upper and lower flushing communications, a basin having a flat bottom and a deep neck opening abruptly therefrom and near the rear of the basin, and an S-shaped trap, the overflow of which is slightly above the flat bottom, while its dip is well down toward the lower end of said deep neck, the angle formed by the deep neck and the flat bottom of the basin being a sharp and abrupt angle, whereby the flushing-water is caused to leave the surface of the basin at the angle of junction with the neck and jump upon the top of the discharging waste matters, substantially as described.

3. The combination with the basin in a water-closet of an S-shaped trap, the upcast limb of which has a bulge or enlargement at one side of the said limb the wall of said enlargement containing a hole in close proximity to the level of the dip of said trap and a supply-pipe for flushing entering said hole, substantially as described.

4. The combination with the basin and S-shaped trap of the bent pipe H, the said trap having a bulge or enlargement in its upcast limb, and the said bent pipe entering said upcast limb through a hole in the wall thereof within said bulge, substantially as described.

5. In a trap jet closet having an upper and lower flushing-supply, the combination of the water-closet bowl A, S-trap C D in the rear of the bowl; retarding-chamber E built entirely in the rear of the bowl and above the trap C D to form side supports or brackets, box-shaped; a flushing-supply pipe entering the trap below the water-level, one branch of which connects with the retarding-chamber; and a water-closet seat-frame supported entirely by said chamber E; together with means for securing said frame to the chamber; substantially as described.

J. PICKERING PUTNAM.

Witnesses:
W. W. SWAN,
WALDRON BATES.